(12) United States Patent
Blumrich et al.

(10) Patent No.: US 7,793,038 B2
(45) Date of Patent: Sep. 7, 2010

(54) SYSTEM AND METHOD FOR PROGRAMMABLE BANK SELECTION FOR BANKED MEMORY SUBSYSTEMS

(75) Inventors: Matthias A. Blumrich, Ridgefield, CT (US); Dong Chen, Croton on Hudson, NY (US); Alan G. Gara, Mount Kisco, NY (US); Mark E. Giampapa, Irvington, NY (US); Dirk Hoenicke, Seebruck-Seeon (DE); Martin Ohmacht, Yorktown Heights, NY (US); Valentina Salapura, Chappaqua, NY (US); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/768,805

(22) Filed: Jun. 26, 2007

(65) Prior Publication Data
US 2009/0006718 A1    Jan. 1, 2009

(51) Int. Cl.
*G06F 12/00* (2006.01)
(52) U.S. Cl. .................... 711/105; 711/104
(58) Field of Classification Search ............. 711/104, 711/105
See application file for complete search history.

(56) References Cited
U.S. PATENT DOCUMENTS

| | | | |
|---|---|---|---|
| 4,777,595 A | 10/1988 | Strecker et al. |
| 5,063,562 A | 11/1991 | Barzilai et al. |
| 5,142,422 A | 8/1992 | Zook et al. |
| 5,349,587 A | 9/1994 | Nadeau-Dostie et al. |
| 5,353,412 A | 10/1994 | Douglas et al. |
| 5,452,432 A | 9/1995 | Macachor |
| 5,524,220 A | 6/1996 | Verma et al. |
| 5,634,007 A | 5/1997 | Calta et al. |
| 5,659,710 A | 8/1997 | Sherman et al. |
| 5,708,779 A | 1/1998 | Graziano et al. |
| 5,761,464 A | 6/1998 | Hopkins |

(Continued)

OTHER PUBLICATIONS

Definition of "mechanism", Oxford English Dictionary, http://dictionary.oed.com/cgi/entry/00304337? query_type=word &queryword=mechanism&first=1&max_to_show=10 &sort_type=alpha&result_place=2&search_id=y2 atEIGc-11603 &hilite+00304337.

(Continued)

*Primary Examiner*—Mardochee Chery
(74) *Attorney, Agent, or Firm*—Scully, Scott, Murphy & Presser, P.C.; Daniel P. Morris, Esq.

(57) ABSTRACT

A programmable memory system and method for enabling one or more processor devices access to shared memory in a computing environment, the shared memory including one or more memory storage structures having addressable locations for storing data. The system comprises: one or more first logic devices associated with a respective one or more processor devices, each first logic device for receiving physical memory address signals and programmable for generating a respective memory storage structure select signal upon receipt of pre-determined address bit values at selected physical memory address bit locations; and, a second logic device responsive to each of the respective select signal for generating an address signal used for selecting a memory storage structure for processor access. The system thus enables each processor device of a computing environment memory storage access distributed across the one or more memory storage structures.

26 Claims, 6 Drawing Sheets

U.S. PATENT DOCUMENTS

| | | | |
|---|---|---|---|
| 5,796,735 A | 8/1998 | Miller et al. |
| 5,809,278 A | 9/1998 | Watanabe et al. |
| 5,825,748 A | 10/1998 | Barleu et al. |
| 5,890,211 A | 3/1999 | Sokolov et al. |
| 5,917,828 A | 6/1999 | Thompson |
| 6,023,732 A | 2/2000 | Moh et al. |
| 6,061,511 A | 5/2000 | Marantz et al. |
| 6,072,781 A | 6/2000 | Feeney et al. |
| 6,122,715 A | 9/2000 | Palanca et al. |
| 6,185,214 B1 | 2/2001 | Schwartz et al. |
| 6,219,300 B1 | 4/2001 | Tamaki |
| 6,263,397 B1 | 7/2001 | Wu et al. |
| 6,295,571 B1 * | 9/2001 | Scardamalia et al. ........ 710/308 |
| 6,311,249 B1 | 10/2001 | Min et al. |
| 6,324,495 B1 | 11/2001 | Steinman |
| 6,356,106 B1 | 3/2002 | Greeff et al. |
| 6,366,984 B1 | 4/2002 | Carmean et al. |
| 6,442,162 B1 | 8/2002 | O'Neill et al. |
| 6,466,227 B1 | 10/2002 | Pfister et al. |
| 6,564,331 B1 | 5/2003 | Joshi |
| 6,594,234 B1 | 7/2003 | Chard et al. |
| 6,598,123 B1 | 7/2003 | Anderson et al. |
| 6,601,144 B1 | 7/2003 | Arimilli et al. |
| 6,631,447 B1 | 10/2003 | Morioka et al. |
| 6,647,428 B1 | 11/2003 | Bannai et al. |
| 6,662,305 B1 | 12/2003 | Salmon et al. |
| 6,735,174 B1 | 5/2004 | Hefty et al. |
| 6,775,693 B1 | 8/2004 | Adams |
| 6,799,232 B1 | 9/2004 | Wang |
| 6,880,028 B2 | 4/2005 | Kurth |
| 6,889,266 B1 | 5/2005 | Stadler |
| 6,894,978 B1 | 5/2005 | Hashimoto |
| 6,954,887 B2 | 10/2005 | Wang et al. |
| 6,986,026 B2 | 1/2006 | Roth et al. |
| 7,007,123 B2 | 2/2006 | Golla et al. |
| 7,058,826 B2 | 6/2006 | Fung |
| 7,065,594 B2 | 6/2006 | Ripy et al. |
| 7,143,219 B1 | 11/2006 | Chaudhari et al. |
| 7,191,373 B2 | 3/2007 | Wang et al. |
| 7,239,565 B2 | 7/2007 | Liu |
| 7,280,477 B2 | 10/2007 | Jeffries et al. |
| 7,298,746 B1 | 11/2007 | De La Iglesia et al. |
| 7,363,629 B2 | 4/2008 | Springer et al. |
| 7,373,420 B1 | 5/2008 | Lyon |
| 7,401,245 B2 | 7/2008 | Fischer et al. |
| 7,454,640 B1 | 11/2008 | Wong |
| 7,454,641 B2 | 11/2008 | Connor et al. |
| 7,461,236 B1 | 12/2008 | Wentzlaff |
| 7,463,529 B2 | 12/2008 | Matsubara |
| 7,539,845 B1 | 5/2009 | Wentzlaff et al. |
| 7,613,971 B2 | 11/2009 | Asaka |
| 7,620,791 B1 | 11/2009 | Wentzlaff et al. |
| 7,698,581 B2 | 4/2010 | Oh |
| 2001/0055323 A1 | 12/2001 | Rowett et al. |
| 2002/0078420 A1 | 6/2002 | Roth et al. |
| 2002/0087801 A1 | 7/2002 | Bogin et al. |
| 2002/0100020 A1 | 7/2002 | Hunter et al. |
| 2002/0129086 A1 | 9/2002 | Garcia-Luna-Aceves et al. |
| 2002/0138801 A1 | 9/2002 | Wang et al. |
| 2002/0156979 A1 | 10/2002 | Rodriguez |
| 2002/0184159 A1 | 12/2002 | Tadayon et al. |
| 2003/0007457 A1 | 1/2003 | Farrell et al. |
| 2003/0028749 A1 * | 2/2003 | Ishikawa et al. ............ 711/220 |
| 2003/0050714 A1 | 3/2003 | Tymchenko |
| 2003/0050954 A1 | 3/2003 | Tayyar et al. |
| 2003/0074616 A1 | 4/2003 | Dorsey |
| 2003/0105799 A1 | 6/2003 | Khan et al. |
| 2003/0163649 A1 | 8/2003 | Kapur et al. |
| 2003/0177335 A1 * | 9/2003 | Luick ........................ 711/210 |
| 2003/0188053 A1 | 10/2003 | Tsai |
| 2003/0235202 A1 | 12/2003 | Van Der Zee et al. |
| 2004/0003184 A1 | 1/2004 | Safranek et al. |
| 2004/0019730 A1 | 1/2004 | Walker et al. |
| 2004/0024925 A1 | 2/2004 | Cypher et al. |
| 2004/0073780 A1 | 4/2004 | Roth et al. |
| 2004/0103218 A1 | 5/2004 | Blumrich et al. |
| 2004/0210694 A1 | 10/2004 | Shenderovich |
| 2004/0243739 A1 | 12/2004 | Spencer |
| 2005/0007986 A1 | 1/2005 | Malladi et al. |
| 2005/0053057 A1 | 3/2005 | Deneroff et al. |
| 2005/0076163 A1 | 4/2005 | Malalur |
| 2005/0160238 A1 | 7/2005 | Steely et al. |
| 2005/0216613 A1 | 9/2005 | Ganapathy et al. |
| 2005/0251613 A1 | 11/2005 | Kissell |
| 2005/0270886 A1 | 12/2005 | Takashima |
| 2005/0273564 A1 | 12/2005 | Lakshmanamurthy et al. |
| 2006/0050737 A1 | 3/2006 | Hsu |
| 2006/0080513 A1 | 4/2006 | Beukema et al. |
| 2006/0206635 A1 | 9/2006 | Alexander et al. |
| 2006/0248367 A1 | 11/2006 | Fischer et al. |
| 2007/0055832 A1 | 3/2007 | Beat |
| 2007/0133536 A1 | 6/2007 | Kim et al. |
| 2007/0168803 A1 | 7/2007 | Wang et al. |
| 2007/0174529 A1 | 7/2007 | Rodriguez et al. |
| 2007/0195774 A1 | 8/2007 | Sherman et al. |
| 2008/0147987 A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al., "Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n. 6, p. 49-58, Jun. 1990.

Michel, Dubois, Christoph Scheurich, Faye A. Briggs, Synchronization, Coherence, and Event Ordering in Multiprocessors, Computer, v.21 n. 2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, No. 2/3, Mar./May 2005 ("Preface").

IBM Journal of Research and Development, Special Double Issue on Blue Gene, Vol. 49, No. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

SYSTEM AND METHOD FOR PROGRAMMABLE BANK SELECTION FOR BANKED MEMORY SUBSYSTEMS

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791 for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to memory architectures in computer systems and, more particularly, to a novel memory storage device and system implementation for enabling a processor device access to multiple memory storage device structures, such as memory caches.

2. Description of the Prior Art

As known, banked memory architectures, e.g., memory cache, comprise a larger memory that is partitioned or divided into distinct blocks that enable more energy efficient use of memory, improves processor cache access time and better exploits parallelism.

It is known that in ASIC memory designs, key design points address the increased overhead in maintaining and implementing a partitioned memory. For example, power and area of the control logic required to implement such banked memory architecture, chip area growth, timing bottlenecks and additional power caused by multiplexed access to memory banks detract from its effectiveness and must be considered in the design.

In present cache system designs, shared banked memory caches aim at distributing accesses either evenly across banks to avoid congestion when using shared randomly accessed data or, provide memory regions assigned to processing elements to avoid congestion by separating accesses. Each of the two architectures provides benefits for a class of applications.

While a banked memory structure assigned and dedicated to each processor is a simple solution, processor access to shared or distributed banked memory architectures is more problematic (in terms of programmability, access time, processing energy, etc.).

In the prior art, U.S. Pat. No. 6,591,345 describes an implementation of a system including a processor device interfaced with a bank-interleaved memory cache, and particularly, a processor enabled to access a bank-interleaved cache containing relatively large strided vectors of data and a method for ensuring maximum access to strided vectors in a bank-interleaved cache memory.

Notwithstanding the innovations of the prior art, it would thus be highly desirable to provide an improved memory access scheme for enabling one or more processor devices to access one or more multiple shared memory banks in a simple and cost-effective manner.

It would further be highly desirable to provide a novel memory architecture that can be configured to provide access distributed across multiple cache memory banks as well as the programmatic capability to assign banks to individual processing elements (e.g., processors).

SUMMARY OF THE INVENTION

The present invention is directed to a novel memory architecture that can be configured to provide access distribution across multiple memory banks as well as the capability to assign banks to individual processing elements. This is achieved by providing programmable selection of memory address to bank mapping. The banked memory systems may comprise a single level cache subsystem, a multi-level cache subsystem or a main memory of a processor.

In accordance with one aspect of the invention, there is provided a programmable memory system and method for enabling one or more processor devices access to shared memory in a computing environment, the shared memory including one or more memory storage structures having addressable locations for storing data. The system comprises:

one or more first logic devices associated with a respective one or more processor devices, each first logic device for receiving physical memory address signals and programmable for generating a respective memory storage structure select signal upon receipt of pre-determined address bit values at selected physical memory address bit locations; and, a second logic device responsive to each the respective select signal for generating an address signal used for selecting a memory storage structure for processor access, the system enabling each processor device of a computing environment memory storage access distributed across the one or more memory storage structures.

Further to this aspect of the invention, there is provided a means for receiving unselected bit values of said received physical memory address signal for generating an offset bit vector signal used to enable processor device access to memory locations within a selected memory storage structure.

Moreover, further to this aspect of the invention, selected address bit values are programmable for enabling a single processor exclusive access to a single memory storage structure.

Furthermore, in one embodiment of the invention, each the associated first programmable logic device includes a multiplexer device programmed to respond to pre-determined bit values at pre-determined physical memory address bit locations.

Furthermore, in an alternate embodiment of the invention, each the associated first programmable logic device implements logic for applying a hash function to the physical memory address signals.

In accordance with a further aspect of the invention, there is provided a method for enabling one or more processor devices access to shared memory provided in a computing environment, the shared memory including one or more memory storage structures having addressable locations for storing data. The method comprises:

receiving, at a first logic device associated with each one or more processor device, a physical memory address signal and determining bit values at select bit address locations of the received physical memory address signal;

generating, at the first logic device, a respective select signal corresponding to one of the one or more memory storage structures based upon the determined address bit values selected; and, generating, at a second logic device, in response to a corresponding select signals, an address signal used for selecting a memory storage structure for a processor device access, wherein each processor device of the computing system is enabled memory storage access distributed across the one or more memory storage structures.

Further to this aspect of the invention, there is provided an additional step of using unselected bit values of the received physical memory address signal to enable processor device access to memory locations within a selected memory storage structure.

Moreover, further to this aspect of the invention, there is provided an additional step of programming the first logic device to provide a single processor device exclusive access to a single memory storage structure upon receipt of predetermined selected address bit values at pre-determined physical memory address bit locations.

Furthermore, there is provided an additional step of programming the first logic device to respond to pre-determined lower physical memory address bit locations used in generating a select signal for providing a single processor device with a substantially even distribution of accesses across the one or more memory storage structures.

Yet still, there is provided an additional step of programming the first logic device to respond to pre-determined higher physical memory address bit locations used for assigning a memory region in the one or more memory structures to one or more processors.

Moreover, according to these aspects of the invention, each associated first programmable logic device output select signal comprises an asserted bit value output, the method further including the step of concatenating, at the second logic device, one or more the bit value outputs from the associated first programmable logic devices and generating a bit vector comprising bit values output from associated first programmable logic devices for use as the address signal.

In accordance with a second embodiment of the invention, there is provided an apparatus and method for enabling one or more processor devices access to shared memory in a computing environment, the shared memory including one or more memory storage structures having addressable locations for storing data. The apparatus comprises:

one or more first logic devices associated with a respective a processor device, each said first logic device for receiving a different subset of address bit signals comprising said physical memory address;

gating means associated with each said one or more first logic devices and each programmable for gating off some or all selected bits of each different subset of address bit signals received at each said first logic device, wherein remaining ungated bits correspond to a desired shared memory storage structure to be accessed, each respective said one or more first logic devices receiving said remaining ungated bits for applying a hash function to said remaining ungated bits and generating a respective memory storage structure select signal; and, a second logic device responsive to each the respective select signal for generating an address signal used for selecting a memory storage structure for processor access, the system enabling each processor device of a computing environment memory storage access distributed across the one or more memory storage structures.

Further to this second embodiment, each associated first logic devices comprises an XOR reduction tree for applying the hash function, an output of each the XOR reduction tree comprising the generated memory storage structure select signal.

Yet further to this second embodiment, each gating means associated with each one or more first logic devices comprises a column of logic gates receiving a respective different subset of address bit signals and receiving a control signal for controlling gating of the some or all selected bits.

Still further to this second embodiment, there is provided a means receiving unselected or gated off bits of each different subset of address bit signals of the received physical memory address and for generating an offset bit vector signal used to access to memory locations within a selected memory storage structure In accordance with a further aspect of the second embodiment of the present invention, there is provided a method for enabling one or more processor devices access to shared memory in a computing environment, the shared memory including one or more memory storage structures having addressable locations for storing data, wherein the method comprises:

receiving, at one or more first logic devices associated with a respective a processor device, a different subset of address bit signals comprising the physical memory address;

gating some or all selected bits of each different subset of address bit signals received at each the first logic device, wherein remaining ungated bits correspond to a desired shared memory storage structure to be accessed, applying, at the one or more first logic devices, a hash function to the remaining ungated bits and generating a respective memory storage structure select signal; and, generating, at a second logic device, in response to a corresponding select signals, an address signal used for selecting a memory storage structure for a processor device access, wherein each processor device of the computing system is enabled memory storage access distributed across the one or more memory storage structures.

Further to this aspect of the invention, there is further implemented a step of receiving a control signal for controlling gating of the some or all selected bits at the each associated the one or more first logic devices.

Moreover, further to this aspect of the invention, there is provided a step of using unselected or gated off bit values of each different subset of address bit signals of the received physical memory address to enable processor device access to memory locations within a selected memory storage structure.

The present invention is advantageously employed in a multiprocessing computer system having a plurality of processor devices each for access a shared banked memory structure, however, can easily be adapted for use in uniprocessor computer systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

The present invention provides a novel memory architecture that is configurable to provide multiple processors access to, and distribution across, multiple memory bank structures, e.g., banked memory caches. The present invention additionally provides the capability to assign memory banks to individual processing elements. This is achieved by providing a programmable memory bank system that provides a mapping of memory addresses to bank selection as will be described in greater detail herein below.

Figure 1:
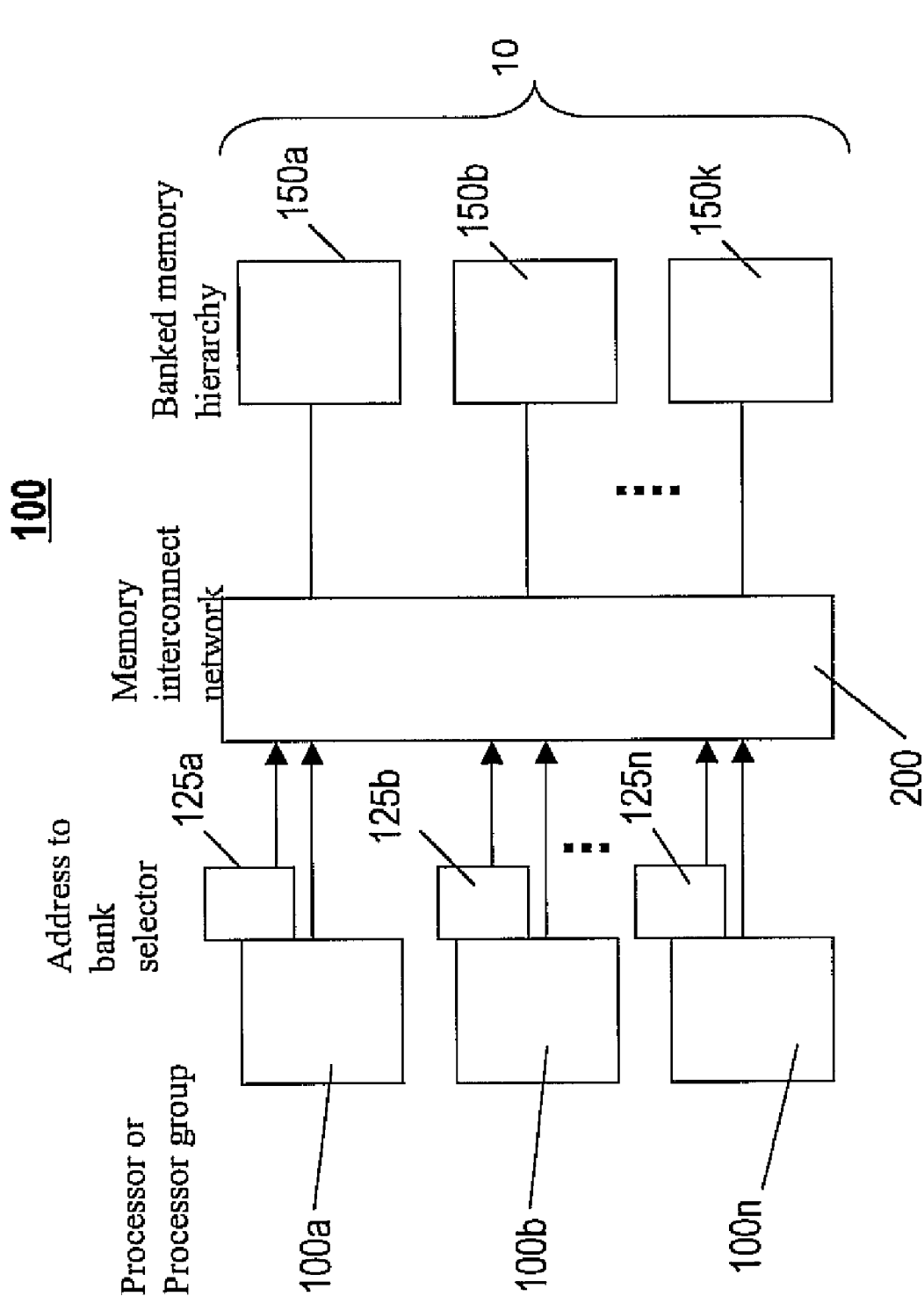
FIG. 1 shows one example embodiment of a programmable memory bank system of the present invention.

FIG. 1 shows one example embodiment of a multiprocessing system 100 including the memory system in which the present invention is employed. The multiprocessor system 100 includes a number "K" of processor units 100a, ..., 100n and, a memory system 10 including one or more memory bank structures 150a, ..., 150k, interconnected with the processor units via an interconnect network 200, and, a network and an address to bank selector unit 125a, ..., 125n associated with a respective processor, for providing widespread distributed processor access across one or more memory banks.

The memory bank structures may comprise any form of electronic, magnetic or optical memory storage structures. In one embodiment, the memory bank structures may comprise a memory cache structure such as found in a computing system. For instance, a computing system may comprise a single or multiprocessor system, and the memory bank structures 150a, ..., 150k may comprises a second or third level data cache in a multi-level cache memory hierarchy. It is understood that the memory bank structures 150a, ..., 150k comprise any addressable memory storage system, such as a main memory or a cache, where memory lines are accessed by addressed memory locations for reading and writing data from/to the processor Storage capabilities may be on the order of 64 KB to hundreds of MB for multilevel cache systems, and even up to hundreds of GB for main memory. The caches themselves may be n-way set-associative for addressability, inclusive, non-inclusive, a victim-cache or other type of cache. This memory may include, in non-limiting examples, volatile or non-volatile memory, SRAM, DRAM, DDR eDRAM, SDRAM DDR-2, and other types of memory such as found embedded in current integrated circuit technology and multi-processing System-on-Chip technology as currently known.

The interconnect network 200 may comprise a bus system, or a single-, two- or multi-staged switching network or like switched interconnect scheme. Moreover, the interconnect network 200 may comprise logic for resolving conflicts should more than one processor device seek to access the same memory location in a memory bank. In the case of such a conflict, the interconnect may arbitrate and serialize the accesses if necessary according to known techniques. Thus, in an example implementation of a high performance computing system having an ASIC multiprocessing node, as described herein below with respect to FIG. 3, the banked memory are the four (4) banks of the L3 and one of the selectors in each L2, which are connected via a two-stage switch to the L3 banks. The first stage of the switch may be implemented inside an arbiter device (not shown) within the L2 cache, and the second state of the switch provided inside each of the two L3s.

Figure 2A:
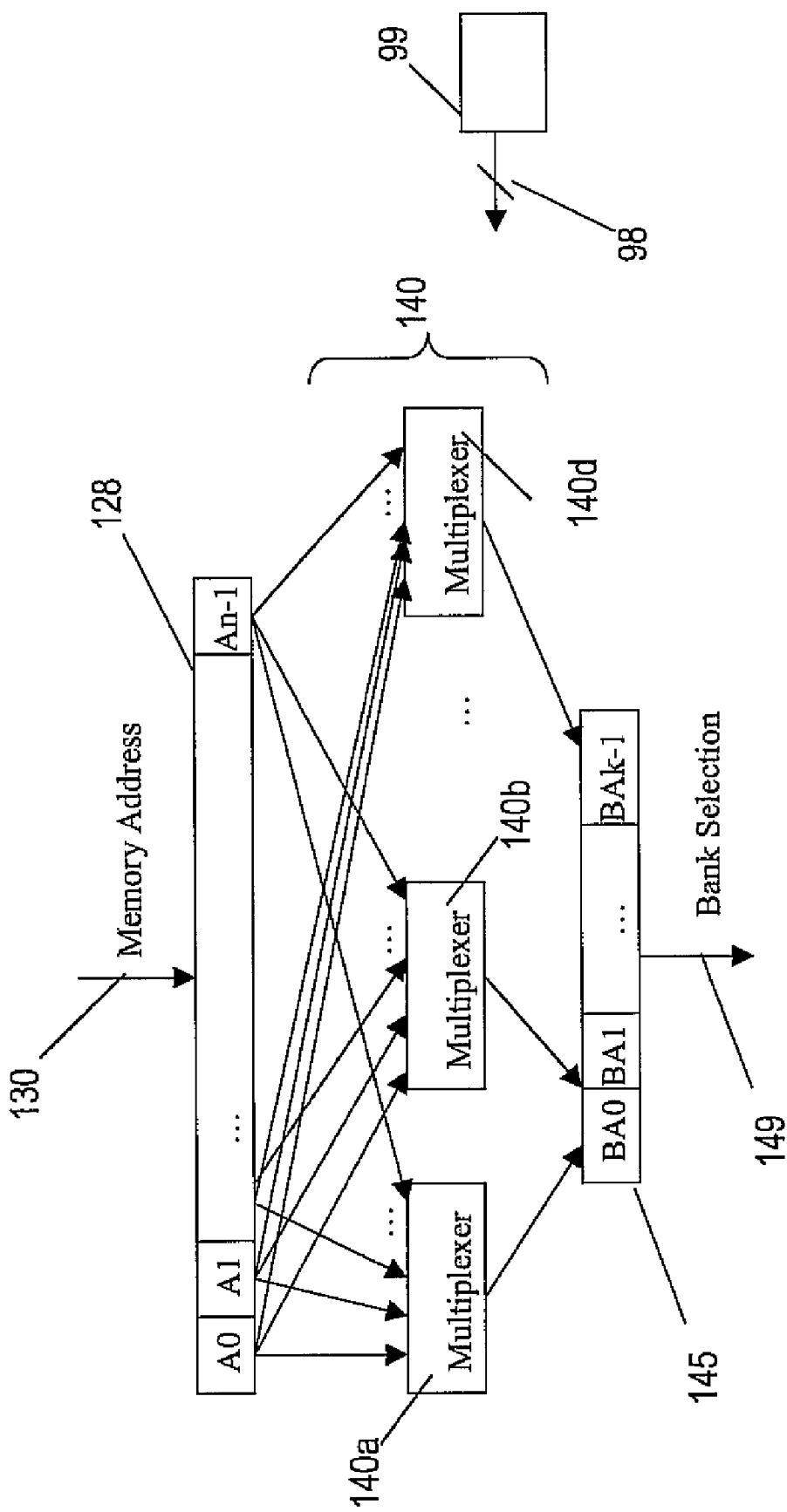
FIG. 2A is a circuit diagram depicting an example address to bank selector for the programmable memory bank system according to one embodiment of the invention.

FIG. 2A is a circuit diagram depicting an address to bank selector unit of the selector units 125a, ..., 125n associated with a respective processor. In one example embodiment, the address/bank selector units 125a, ..., 125n are provided as part of the L2 cache which may be embedded in a processor device or ASIC processor node of a single or multiprocessor system.

The unit 125 shown in FIG. 2A is a multiple bit selector apparatus for extracting individual bits from the physical memory address issued by a processor when making a request, e.g., read/write access to data in a specific location(s) in a memory bank. In one example embodiment of the invention, the multiple bit selector includes an input register 128 or any kind of memory array output or the result of a combinatorial address generation or selection for receiving a physical memory address signal 130, e.g., via an address bus (not shown). The address may be any width in bits, and particular, must be anything wider than: upper limit($\log_2$(number of cache banks)), to enable access to all addressable memory locations of the address banks 150a, ..., 150k and achieve the flexibility for selecting specific bits according to the invention. In one example implementation of a computer system employing the present invention, the physical address for main memory may range anywhere up to 34 bits wide and the bank selection bits may be selected from the upper 27 bits of this address, in one non-limiting embodiment. It is understood that other address and bit selector schemes are possible without detracting from the scope of the invention.

Each of the address bits received and at logic device 128 are selected by a series of programmed multiplexor devices 140 that receive some or all of the address bits. In one embodiment, each multiplexor is programmable to select a specific bit of the received physical memory address register which selected bits are then concatenated by a logic device 145 to form a bit vector representing a memory bank address, output of the device and used for selecting a specific memory bank.

The concatenation may be performed by combinatorial logic that generates a bank selection address vector 149 i.e., for example, the bit address vector may be one bit wide for 2 banks, or it can be wider for multiple banks.

As such, there may be one multiplexer device 140 for every bit needed in the bank address. So there may be, in an example embodiment, an upper limit($\log_2$(number of bank)) multiplexor devices 140. Each selector multiplexor performs the same decision for the same physical address, so each physical address ends up selecting one specific bank. Different addresses may end up in different banks. The configuration of the selector decides if, for example, subsequent addresses end up in the same bank or if they are scattered across banks.

Figure 2B:
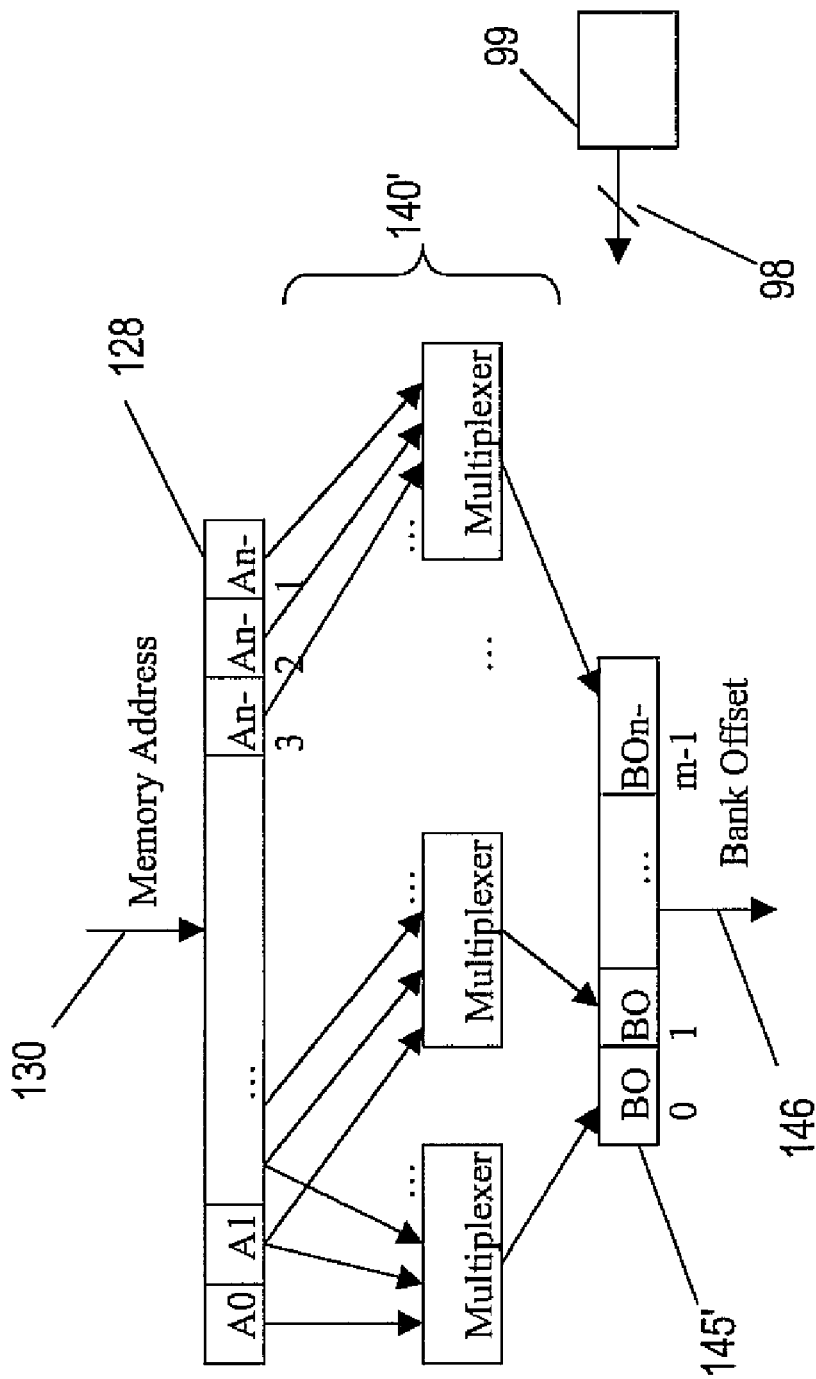
FIG. 2B depicts a general selector for the remaining bits used to address memory locations within a bank.

More particularly, the bank selection address 130 is sent along with the request issued by the processor to the memory subsystem network 10 via the bus or interconnect network 200 which routes the request to the specific bank selector device from the issued physical address as determined by the selector. As only selected bits are used in selecting the memory bank, the bits of the original memory address that are not selected to form from the bank address are provided to the selected bank as bank offset signal BO where those bits are decoded to address the requested data stored within the selected memory bank. FIG. 2B depicts a circuit diagram 175, in an example embodiment, for selecting the address bits out of received address that are not selected for the bank address generation. Address bits received at logic device 128 are again selected by a series of programmed multiplexor devices 140' to form the bank offset BO signal 146 comprising a vector of bits BO0, BO1, ..., BOn-m-1 as concatenated by a logic device 145'. That is, from the remaining bits of the physical address, a multiplexer selects each bit of the BO signal 146.

It should be understood that, in the embodiments of the invention depicted, the bit selectors are configured statically before the memory is loaded. For programs that benefit from an even distribution of accesses across banks, the selectors are programmed to choose lower address bits to form the bank selection. For programs that benefit from non-shared memory accesses, higher address bits are selected and memory regions that are distinguishable via these high addresses are assigned to each processor or processor group.

In one implementation configuration registers are statically programmed by the processor cores or, by an external control system 99 via a Device Configuration Register (DCR) bus 98. This DCR bus is distinct from the network connecting the memory hierarchy levels.

Thus, in an example implementation, shown in FIG. 2A, when selecting from one of four memory bank structures (k=4 as described with respect to FIG. 1), the physical memory address may be 34 bits wide with bit numbering from A33 (a MSb) down to A0 (a LSb). Each cache line may be 128 bytes wide. When programming the selector multiplexer to pick bits A8 and A7 as the bank address, for example, subsequent cache lines are stored to subsequent banks, as follows:

address 0->bank 0 [where a mux 140a is programmed to select bank 0 (BA0) when memory address bits A8, A7 are 0, 0 respectively];

address 128->bank 1 [where a mux 140b is programmed to select bank 1 (BA1) when memory address bits A8, A7 are 0, 1 respectively];

address 256->bank 2 [where a mux is programmed to select (BA2) when memory address bits A8, A7 are 1, 0 respectively];

address 384->bank 3 [where a mux is programmed to select (BA3) when memory address bits A8, A7 are 1,1 respectively] and, address 512->bank 0, etc.

These multiplexers 140 include processing for receiving the address bits to form the respective bank selection signals which is used to form the bank address used for selecting the memory bank. Similarly, when programming the selector multiplexer to pick bits A33 and A32, the first 4 Gigabytes of memory are mapped to bank 0, the next 4 GB to bank 1, the next to bank2 and the last to bank 3. In this manner, a processor may have a single memory bank allocated to them at these programmed memory addresses. For example, when allocating memory for processor 0, address ranges from the first 4 GB can be assigned, when allocating for processor 1, address ranges from next 4 GB can be assigned and so on. When the processors access their assigned address ranges, a unique mapping from processor to bank is provided eliminating conflicts between processors when competing for a bank.

Figure 4:
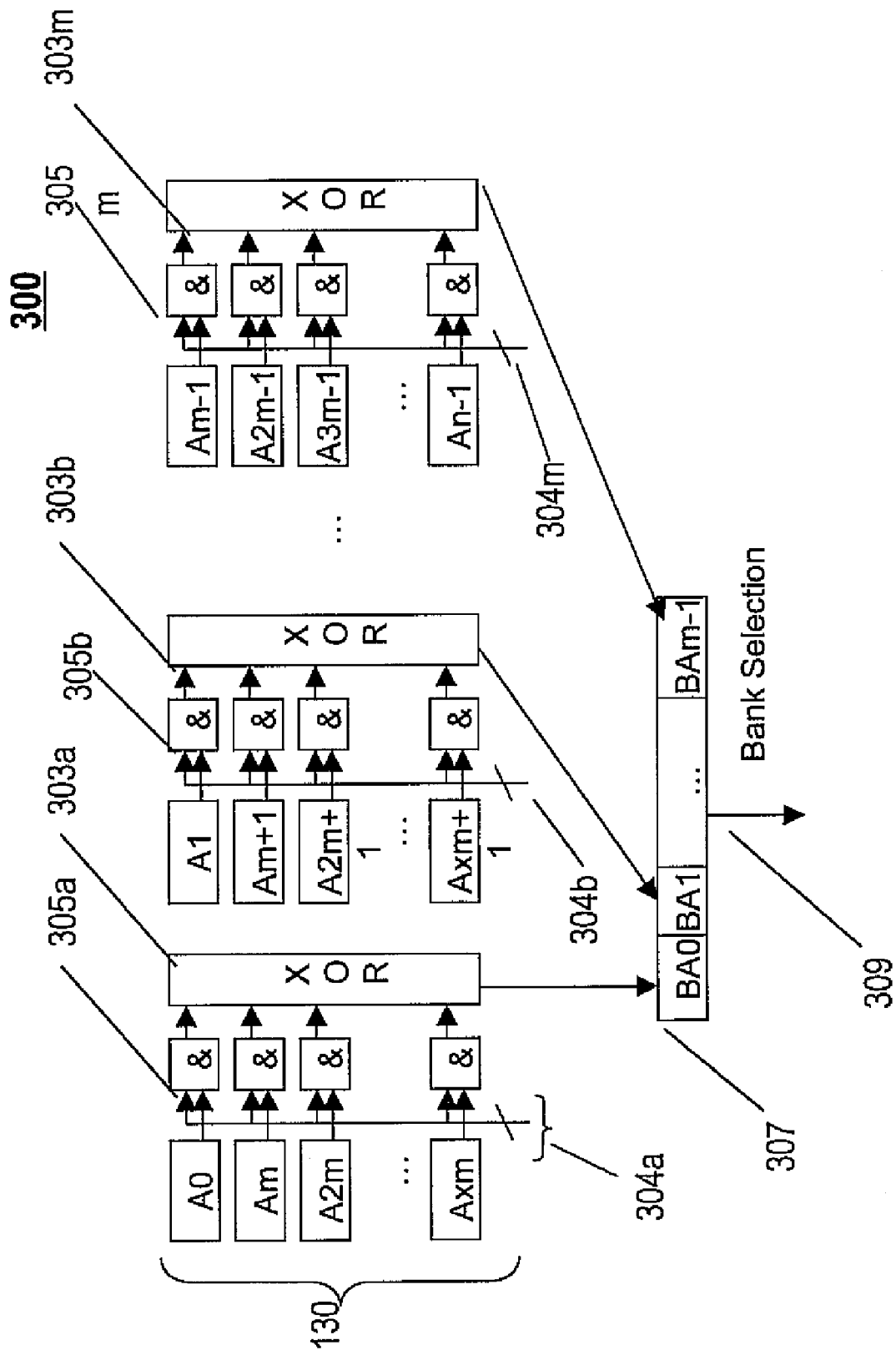
FIG. 4 depicts an XOR-tree based hash function to generate the bank selector vector; and, FIG. 5 depicts a selector for the remaining bits used to address memory locations within a bank.

In an alternate implementation, multiple address bits may be selected and a hashing algorithm implemented to generate a bank selector address. A hash function could for example be an XOR reduction of a group (e.g. a subset) of address bits that each generates a respective bank selector bit signal. FIG. 4 depicts a block diagram of an example hash function 300 that could be implemented by logic for generating bank selector signal 309 comprising, e.g., bits BA0, BA1, ..., Bam-1 output from respective. In this embodiment, the multiplexers (MUXes 140 of FIG. 2A) are replaced by a respective XOR reduction tree 303a, 303b, ..., 303m each of which receives a subset of address bit signals, for which each address bit signal input can be gated off via a static selector control, such as may be implemented by logic, e.g., a respective column of AND logic gates 305a, 305b, . . . , 305m, similar to the multiplexor control described with respect to FIG. 2A. Particularly, in this embodiment, each respective bank of AND logic gates 305a, 305b, . . . , 305m receives control signals as input from a respective bus 304a, 304b, . . . , 304m to perform the individual bit gating selection. If all XOR tree inputs but one are gated off, the XOR tree acts like a simple multiplexor. If more than one input is not gated off, the XOR tree performs a hash function across the ungated bits. Each XOR tree generating one of the bank address bits can be sourced by two or more address bits of the physical address. Each XOR tree 303a, 303b, . . . , 303m implementing a hash function generates a single bit output, e.g., bits BA0, BA1, . . . , Bam−1, which bits may then be concatenated by a logic device 307 for forming bank selector signal 309, a bit vector.

Accesses to two addresses that differ only in an address bit that is feeding the XOR tree and is not gated off will result in selection of different banks for the two addresses. Strided access patterns may only cause changes in a limited set of address bits. By ungating many address bits, the bank selection becomes sensitive to all these bits, distributing accesses of most strides evenly across the banks.

Figure 5:
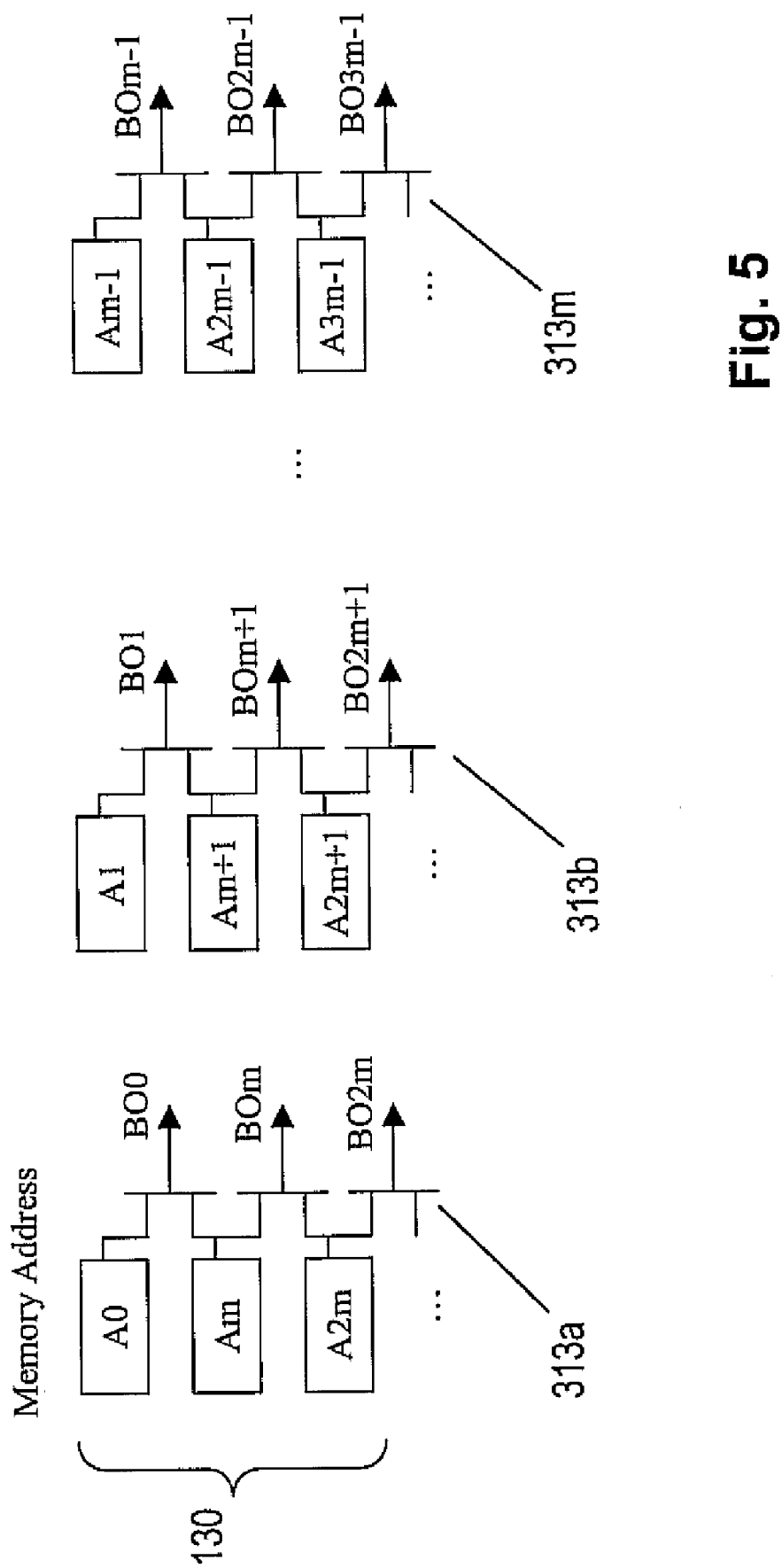

FIG. 5 depicts a selector for the remaining bits used to address memory locations within a bank selected via the hash function 300 of FIG. 4. To generate the bank offset for the hash function outlined above, all address bits 130 that are not feeding any XOR tree 303a, 303b, . . . 303m (of FIG. 4), all address bits that are gated off at the input of the XOR trees and all but one of the ungated XOR tree inputs have to be selected using respective selector devices 313a, 313b, . . . , 313m which may comprise a column of 2:1 multiplexers receiving the address bits. An embodiment for generating the bank offset BO comprising bit vector of bits BO0, BO1, . . . , BOn−m−1 is as in the general multiplexor-based design depicted in FIG. 2B with the hash functions implemented instead of the multiplexers. The embodiment depicted in FIG. 5 enables exclusion of one address bit in every multiplexor column.

The present invention is advantageously employed for certain computing system architectures, such as the "BlueGene/P" high-performance computing system, such as available from International Business Machines Corp. (IBM) where a compute node is provided comprising an indivisible multi-processor unit, formed of System-on-Chip (SOC) technology, that includes, for example, a plurality of processors each with one or more levels of cache. In one embodiment, the present invention is implemented in a processing node of a Ultrascalable Petaflop Parallel Supercomputer architecture such as shown and described in greater detail in commonly-owned, co-pending U.S. patent application Ser. No. 11/768, 905 that comprises multiple processing nodes organized in one form, as a three-dimensional torus interconnected and designed to deliver processing power on the order of a petaflops (a quadrillion floating-point operations per second) for a wide range of applications. In an exemplary embodiment, the Massively Parallel Supercomputer architecture comprises 72K processing nodes organized as a 72×32×32 with each compute node being connected to six (6) neighboring nodes via 6 bi-directional torus links.

Figure 3:
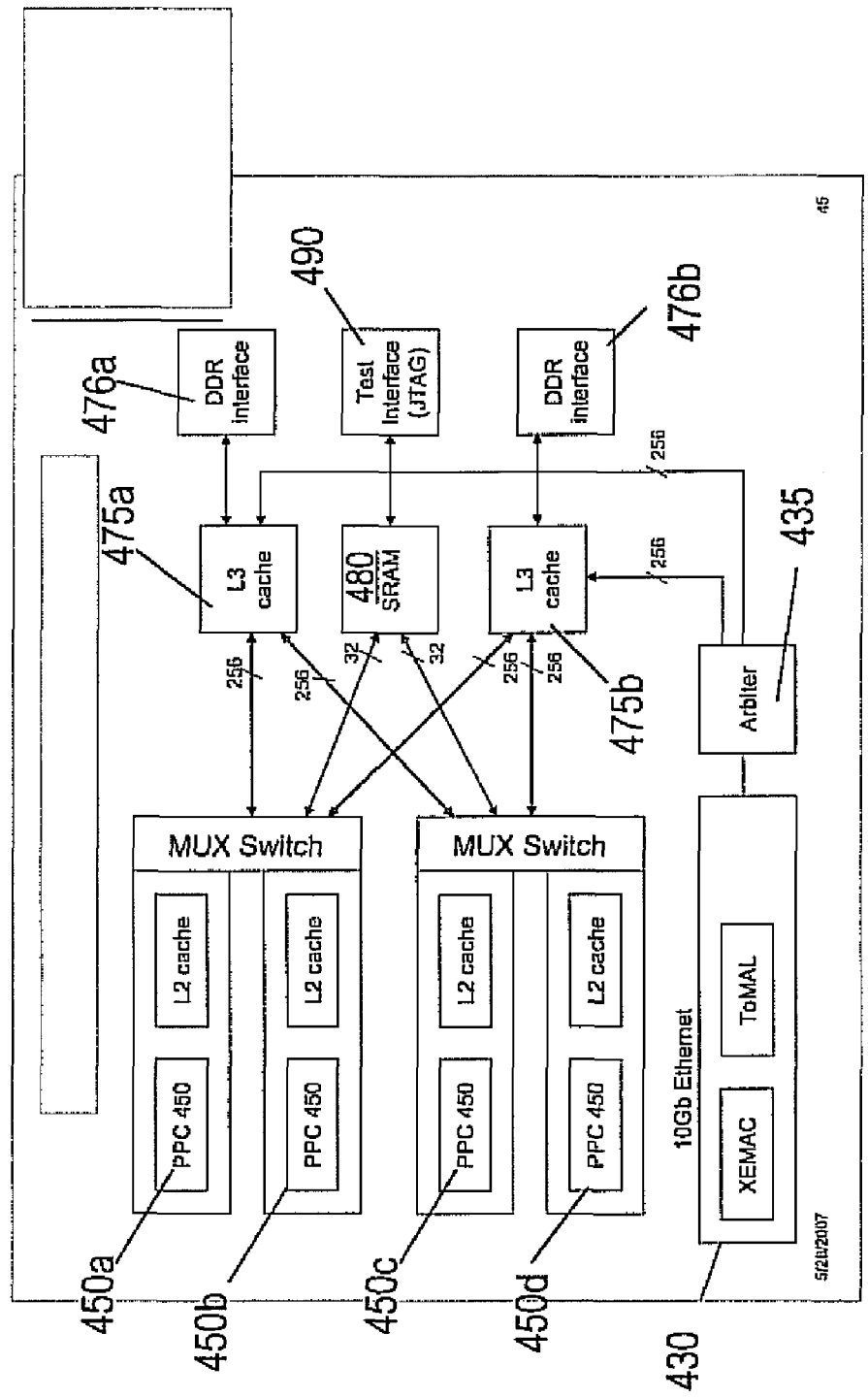
FIG. 3 depicts a high level schematic diagram illustrating a single computing node ASIC 400 in which the present invention may be employed.

FIG. 3 particularly illustrates a block diagram depicting a single computing node ASIC 400 in which the present invention may be employed. Each node preferably is based on the chip process that integrates all the functions of a computer into a single compute ASIC, enabling dramatic reduction of node size and power consumption. In a supercomputer, this can be further leveraged to increase node density thereby decreasing the overall cost/performance for the machine. As shown in FIG. 3, the ASIC of this design, which may function as both a compute node and an I/O node in the system, include four processing cores, e.g., cores 440a, . . . 440d, each having a "double" floating point unit (not shown), that may include two coupled standard floating point units. This arrangement gives a peak performance of four floating point operations per processor core per clock cycle. The processor core, in one embodiment, is a PowerPC450 embedded core available from IBM microelectronics, although future versions of this core may be used as technology improves. The "Double" FPU unit increases the data bandwidth by increasing the datapath from 64 bits to 128 bits to allow for quadword Floating Point loads and stores (i.e., data moving).

As shown in FIG. 3, the node 400 further incorporates other functions into the ASIC. Besides the embedded processing core and floating point cores, the system includes embedded DRAM 475a, 475b an integrated external DDR2 memory controller, DMA (not shown), 10 Gb Ethernet functionality as well as network link cut-through routing buffers and routing control block that allow any two nodes to communicate with low latency. The compute node particularly includes four embedded cores, such as the PPC450, each capable of being utilized for message handling and computation operations.

Also included in a node 400 is a Scratch SRAM 480, provided to serve as a background communication mechanism with a host system (not shown). All four cores have equal access to the SRAM which is critical for the independent exchange of messages between each core and the host system. The size of the Scratch SRAM may range on the order of 32-128 KB.

Further in FIG. 3, there is additionally provided two DDR-2 controllers 476a,b which enable use of the low cost commodity DDR-2 external memory. As mentioned, the latency to this external memory is one of the critical design parameters and different memory configurations may be supported with the internal DDR-2 controller thereby allowing many system memory configurations.

In a preferred embodiment, the same compute node ASIC may be used as an I/O node which is associated with a subset of the compute nodes (16, 32, 64, or 128 compute nodes), for handling fileserver communication and I/O operations. That is, the I/O nodes are identical to the compute nodes. The only difference is that an I/O node enables and uses an external network interface 430, such as a 10 Gigabit Ethernet. It is understood that the compute ASIC nodes may have the integrated 10 Gb Ethernet. The 10 Gb Ethernet functional units (XEMAC, ToMAL) interfaces to an arbiter 435 which arbitrates inputs to L3 level cache from torus DMA and from 10 Gb Ethernet. This allows the processor within a node to set up a transfer and return to handling messages with very little overhead.

The node ASIC additionally includes the functionality necessary to boot, debug and support RAS (reliability, availability and serviceability). On the ASIC, this functionality is provided by an extension of the IEEE1149.1-1993 standard, also known as the JTAG standard. As in the predecessor system described in commonly-owned, co-pending International Patent application PCT/US02/05571 filed Feb. 25, 2002 entitled "A Novel Massively Parallel Supercomputer, extensive use is made of these JTAG TDRs for chip self test functions, for boot code loading, for chip configuration and control, for monitoring and for debug. In particular, each of the PPC450 cores has a slave JTAG interface 490 that can be used with the IBM RiscWatch™ software for detailed debug operations of each PPC450 core.

From a full system perspective, the supercomputer as a whole is controlled by a Service Node (not shown), which is the external computer that controls power-up of the machine, partitioning, boot-up, program load, monitoring, and debug. The Service Node runs the Control System software. The Service Node communicates with the supercomputer via a dedicated, private 1 Gb/s Ethernet connection (not shown). This service node may be used for programming the multiplexor settings or configuring logic devices 140a, . . . 140d of FIG. 2A, to respond to select physical memory address bits (e.g., bits A7, A8, A32, A33) for generating the bank selector and memory allocations for a banked memory system. This enables simultaneous processor use of the shared memory bank system.

More particularly, with respect to the compute node memory system, there is included an on-chip cache hierarchy, an off-chip main store, and optimized on-chip support for locking and communication between the four ASIC processor cores 440a, . . . 440d. The memory system is architected for peak performance over a range of target applications. The aggregate memory of the machine is completely distributed in the style of a multi-computer with no hardware sharing between nodes. Each node may own, for example, 2 gigabytes of physical memory, resulting in a total of 144 terabytes in a 72K-node system. As shown in FIG. 1, the physical memory of the node is shared by the four processors within the ASIC, and the hardware provides optional coherence support.

Although not shown in FIG. 3, each processor core includes a first-level L1 cache comprising an instruction cache (L1 I-cache) and a data cache (L1 D-Cache), which are each both part of the 450 core macro. The data cache produces two separate 128-bit data buses to and from L2, one for reading and one for writing. Unlike the previous generation, the PowerPC 450 core provides hardware support for cache coherence for write-invalidate cache coherence protocol for multicore coherence. The nodal memory system additionally includes a main store (not shown) that may comprise double-data rate DDR2) DRAM. It is built from commodity double-data rate synchronous DRAM (SDRAM DDR-2) devices and which may be external to the node ASIC.

FIG. 3 further depicts the overall architecture of L2 and L3. Second-level L2 cache is relatively smaller and basically serve as a prefetch and write-back buffers for the third-level (L3) cache which is larger. In one embodiment, multiplexer (i.e., MUX) switches 431,a, 431b connect four (4) L2 level caches to two (2) memory banks of L3 at 4 MB capacity each. L3 is shared by instructions and data, and provides high-bandwidth, low-power access to the working set of most applications. The L3, being integrated on the SOC, has higher bandwidth and shorter latency, and it greatly eases the memory wall problem.

In one embodiment, the L3 cache is constructed of embedded DRAM (eDRAM and, in one non-limiting embodiment, is 8 Mbytes in size. Several options for the organization of the cache are possible. For example, in one embodiment, a straightforward set-associative cache, shared by four processors, is implemented. In another embodiment, two L3 caches, each of which is shared, are implemented. The cache organization enables four processors to access L3 simultaneously in the best case. The capability of partitioning off a portion of the L3 cache for direct access is additionally possible. In one advantageous embodiment, the L3 cache may be divided into multiple memory banks for processor access, which would require four banks of macros. Processor access to these memory banks is enabled in the L2 cache where the programmable memory bank selector of the present invention is advantageously implemented.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A programmable memory system for enabling one or more processor devices access to shared memory in a computing system, said shared memory comprising one or more memory storage structures having addressable locations for storing data for said one or more processor devices, said system comprising:

one or more first logic devices associated with a respective said one or more processor devices, each one or more first programmable logic devices for receiving physical memory address bits, each one or more first logic devices programmed to generate a respective memory structure select signal upon receipt of address bit values at pre-determined physical memory address bit locations:

a second logic device responsive to each said respective select signal for generating an address signal used for selecting a memory storage structure for processor access, wherein each processor device of said computing system enables memory storage access distributed across said one or more memory storage structures, and, means for receiving unselected bit values of said received physical memory address for generating an offset bit vector signal used to enable processor device access to memory locations within a selected memory storage structure, wherein each said respective select signal comprises an asserted bit value output, said second logic device for concatenating one or more said asserted bit value outputs from said associated first logic devices to generate a bit vector for use as said address signal used to select a memory storage structure.

2. The programmable memory system as claimed in claim 1, wherein said address bit values at pre-determined physical memory address bit locations are programmable for enabling a single processor exclusive access to a single memory storage structure.

3. The programmable memory system as claimed in claim 1, wherein each said one or more associated first logic device includes a multiplexer device programmed to respond to said address bit values at pre-determined physical memory address bit locations.

4. The programmable memory system as claimed in claim 1, wherein each said one or more associated first logic device implements logic for applying a hash function to said physical memory address bits.

5. The programmable memory system as claimed in claim 4, wherein each said one or more associated first e logic device comprises an XOR reduction tree for applying a hash function, an output of each said XOR reduction tree generating said memory storage structure select signal.

6. The programmable memory system as claimed in claim 1, wherein each said one or more associated first logic device is responsive to pre-determined physical memory address bit locations having bit values used in generating said select signal for enabling even distribution of accesses across said one or more memory storage structures.

7. The programmable memory system as claimed in claim 1, wherein each said one or more associated first logic device is responsive to other pre-determined physical memory address bit locations used for assigning a memory region in said one or more memory structures to one or more processors.

8. The programmable memory system as claimed in claim 1, wherein said one or more memory storage structures comprises a single cache memory system, a multi-level memory system or a main memory storage system for a processor device.

9. A method for accessing a shared memory provided in a computing system having one or more processor devices, said shared memory organized as a plurality of memory storage structures having addressable locations for storing data for said one or more processor devices, said method comprising:
receiving, at a first logic device associated with each one or more processor devices, physical memory address bits and selecting bit values at pre-determined bit address locations of said received physical memory address signal;
generating, at said first logic device, a respective select signal corresponding to one of said plurality of memory storage structures based upon said pre-determined address bit values selected; and,
generating, at a second logic device, in response to a corresponding select signal, an address signal used for selecting a memory storage structure for a processor device access, wherein each processor device of said computing system is enabled memory storage access distributed across said plurality of memory storage structures, and,
using unselected bit values of said received physical memory address signal to enable processor device access to memory locations within a selected memory storage structure
wherein each said respective select signal comprises an asserted bit value output,
said second logic device for concatenating one or more said asserted bit value outputs from each said associated first logic devices and generating a bit vector for use as said address signal.

10. The method as claimed in claim 9, further comprising:
programming said first logic device to provide a single processor device exclusive access to a single memory storage structure upon receipt of predetermined selected address bit values at pre-determined physical memory address bit locations.

11. The method as claimed in claim 9, further comprising:
programming each said one or more first logic devices to respond to pre-determined physical memory address bit locations used in generating said respective select signal for providing a single processor device with even distribution of accesses across said one or more memory storage structures.

12. The method as claimed in claim 9, further comprising:
programming said first logic device to respond to other pre-determined physical memory address bit locations used for assigning a memory region in said one or more memory structures to one or more processors.

13. A multiprocessor computing system comprising one or more processor devices and a shared memory comprising one or more memory storage structures having addressable locations for storing data for said one or more processor devices, said system comprising:
one or more first logic devices associated with a respective said one or more processor devices, each first logic device for receiving physical memory address bits, and each one or more first logic devices programmed to generate a respective select signal corresponding to one of said one or more memory storage structures upon receipt of address bit values at pre-determined physical memory address bit locations;
a second logic device responsive to said corresponding respective select signal for generating an address signal used for selecting a memory storage structure for processor access, wherein each processor device of said computing system enables memory storage access distributed across said one or more memory storage structures,
wherein unselected bit values of said received physical memory address bits are used to enable processor device access to memory locations within a selected memory storage structure, and,
wherein each said one or more associated first logic device output select signal comprises an asserted bit value output,
said second logic device for concatenating one or more said asserted bit value outputs from said one or more associated first logic devices and generating a bit vector for use as said address signal used to select a memory storage structure.

14. The multiprocessor computing system as claimed in claim 13, wherein said address bit values at said pre-determined physical memory address bit locations enable a single processor exclusive access to a single memory storage structure.

15. The multiprocessor computing system as claimed in claim 13, wherein each said one or more associated first logic device includes a multiplexer device programmed to respond to said address bit values at pre-determined physical memory address bit locations.

16. The multiprocessor computing system as claimed in claim 13, wherein each said one or more associated first logic device implements logic for applying a hash function to said physical memory address bits.

17. The multiprocessor computing memory system as claimed in claim 16, wherein each said one or more associated first logic device comprises an XOR reduction tree for applying a hash function, an output of each said XOR reduction tree generating said memory storage structure select signal.

18. An apparatus for enabling one or more processor devices access to shared memory in a computing system, the shared memory including one or more memory storage structures having addressable locations for storing data, said apparatus comprising:
one or more first logic devices associated with a respective processor device that provides a physical memory address, each said one or more first logic device for receiving a different subset of address bit signals comprising said physical memory address;
gating means associated with each said one or more first logic devices and each programmable for gating off some or all selected bits of each different subset of address bit signals received at each said respective said one or more first logic devices, wherein remaining ungated bits correspond to a desired shared memory storage structure to be accessed, each respective said one or more first logic devices receiving said remaining ungated bits for applying a hash function to said remaining ungated bits and generating a respective memory storage structure select signal; and, a second logic device responsive to each the respective select signal for generating an address signal used for selecting a memory storage structure for processor access, each respective select signal comprising a single output bit, said second logic device for concatenating one or more said single bit outputs from respective said one or more associated first logic devices to generate a bit vector for use as said address signal used to select a memory storage structure, whereby each processor device of a computing environment enables memory storage access distributed across the one or more memory storage structures.

19. The apparatus as claimed in claim 18, wherein each said one or more associated first logic devices comprises an XOR reduction tree for applying said hash function, an output of each said XOR reduction tree comprising said generated memory storage structure select signal.

20. The apparatus as claimed in claim 19, wherein each said gating means associated with each said one or more first logic devices comprises a column of logic gates receiving a respective different subset of address bit signals and receiving a control signal for controlling gating off said some or all selected bits.

21. The apparatus as claimed in claim 20, wherein each said logic gates include an AND gate.

22. The apparatus as claimed in claim 18, further comprising: a means for receiving unselected or gated off bit values of each different subset of address bit signals of the received physical memory address and for generating an offset bit vector signal used to access memory locations within a selected memory storage structure.

23. A method for enabling one or more processor devices access to shared memory in a computing system, the shared memory including one or more memory storage structures having addressable locations for storing data, said method comprising:

receiving, at one or more first logic devices associated with a respective processor device that provides a physical memory addresses, a different subset of address bit signals comprising said physical memory address;

gating some or all selected bits of each different subset of address bit signals received at each said first logic device, wherein remaining ungated bits correspond to a desired shared memory storage structure to be accessed, applying, at said one or more first logic devices, a hash function to said remaining ungated bits and generating a respective memory storage structure select signal; and, generating, at a second logic device, in response to a corresponding select signal, an address signal used for selecting a memory storage structure for a processor device access, each respective select signal comprising a single output bit, said second logic device for concatenating one or more said single bit outputs from respective said one or more associated first logic devices to generate a bit vector for use as said address signal used to select a memory storage structure, wherein each processor device of said computing system is enabled memory storage access distributed across said one or more memory storage structures.

24. The method as claimed in claim 23, wherein each said one or more associated first logic devices comprises an XOR reduction tree for applying said hash function, an output of each said XOR reduction tree comprising said generated memory storage structure select signal.

25. The method as claimed in claim 23, further comprising:
receiving at a control signal for controlling gating of said some or all selected bits at said each associated said one or more first logic devices.

26. The method as claimed in claim 23, further comprising:
using unselected or gated off bit values of each different subset of address bit signals of the received physical memory address to enable processor device access to memory locations within a selected memory storage structure.

* * * * *